(12) United States Patent
Cervone et al.

(10) Patent No.: US 8,583,437 B2
(45) Date of Patent: Nov. 12, 2013

(54) SPEECH SYNTHESIS WITH INCREMENTAL DATABASES OF SPEECH WAVEFORMS ON USER TERMINALS OVER A COMMUNICATIONS NETWORK

(75) Inventors: Alessio Cervone, Rome (IT); Ivano Salvatore Collotta, Turin (IT); Paolo Coppo, Turin (ID); Donato Ettorre, Turin (IT); Maurizio Fodrini, Turin (IT); Maura Turolla, Turin (IT)

(73) Assignee: Telecom Italia S.p.A., Milan (IT)

( * ) Notice: Subject to any disclaimer, the term of this patent is extended or adjusted under 35 U.S.C. 154(b) by 819 days.

(21) Appl. No.: 11/921,403

(22) PCT Filed: May 31, 2005

(86) PCT No.: PCT/EP2005/005818
§ 371 (c)(1),
(2), (4) Date: Mar. 11, 2009

(87) PCT Pub. No.: WO2006/128480
PCT Pub. Date: Dec. 7, 2006

(65) Prior Publication Data
US 2009/0306986 A1 Dec. 10, 2009

(51) Int. Cl.
*G10L 13/00* (2006.01)
*G10L 13/08* (2013.01)

(52) U.S. Cl.
USPC .................. 704/258; 704/266; 704/270.1

(58) Field of Classification Search
USPC .............. 704/258, 260, 261, 266, 269, 270.1; 379/88.16, 88.17, 88.23
See application file for complete search history.

(56) References Cited

U.S. PATENT DOCUMENTS

| | | | |
|---|---|---|---|
| 6,173,250 B1 * | 1/2001 | Jong | 704/3 |
| 6,408,272 B1 * | 6/2002 | White et al. | 704/270.1 |
| 6,446,040 B1 * | 9/2002 | Socher et al. | 704/260 |
| 6,950,798 B1 * | 9/2005 | Beutnagel et al. | 704/260 |

(Continued)

FOREIGN PATENT DOCUMENTS

| | | |
|---|---|---|
| EP | 1 431 958 A1 | 6/2004 |
| EP | 1 471 499 A1 | 10/2004 |

(Continued)

OTHER PUBLICATIONS

Segi et al., "A concatenative speech synthesis method using context dependent phoneme sequences with variable length as search units," NHK (Nippon Hoso Kyokai; Japan Broadcasting Corp.) Science and Technical Research Laboratories, 5th ISCA Speech Synthesis Workshop, Pittsburgh, USA, Jun. 2004, 6 pages.

*Primary Examiner* — Martin Lerner
(74) *Attorney, Agent, or Firm* — Finnegan, Henderson, Farabow, Garrett & Dunner, L.L.P.

(57) ABSTRACT

Service architecture for providing to a user terminal of a communications network textual information and relative speech synthesis, the user terminal being provided with a speech synthesis engine and a basic database of speech waveforms includes: a content server for downloading textual information requested by means of a browser application on the user terminal; a context manager for extracting context information from the textual information requested by the user terminal; a context selector for selecting an incremental database of speech waveforms associated with extracted context information and for downloading the incremental database into the user terminal; a database manager on the user terminal for managing the composition of an enlarged database of speech waveforms for the speech synthesis engine including the basic and the incremental databases of speech waveforms.

21 Claims, 4 Drawing Sheets

(56) References Cited

U.S. PATENT DOCUMENTS

| | | | |
|---|---|---|---|
| 7,035,794 B2* | 4/2006 | Sirivara | 704/219 |
| 7,533,023 B2* | 5/2009 | Veprek et al. | 704/270.1 |
| 7,599,838 B2* | 10/2009 | Gong et al. | 704/258 |
| 2002/0013708 A1* | 1/2002 | Walker et al. | 704/260 |
| 2002/0156630 A1* | 10/2002 | Hayashi et al. | 704/258 |
| 2002/0188449 A1* | 12/2002 | Nukaga et al. | 704/258 |
| 2003/0023442 A1* | 1/2003 | Akabane et al. | 704/260 |
| 2003/0028377 A1* | 2/2003 | Noyes | 704/258 |
| 2004/0054534 A1 | 3/2004 | Junqua | |
| 2004/0215460 A1* | 10/2004 | Cosatto et al. | 704/260 |
| 2005/0256716 A1* | 11/2005 | Bangalore et al. | 704/260 |

FOREIGN PATENT DOCUMENTS

| | | |
|---|---|---|
| GB | 2 406 983 A | 4/2005 |
| JP | 2003-233386 | 8/2003 |
| WO | WO-00/30069 | 5/2000 |
| WO | WO-2004/032112 A1 | 4/2004 |

* cited by examiner

SPEECH SYNTHESIS WITH INCREMENTAL DATABASES OF SPEECH WAVEFORMS ON USER TERMINALS OVER A COMMUNICATIONS NETWORK

CROSS REFERENCE TO RELATED APPLICATION

This application is a national phase application based on PCT/EP2005/005818, filed May 31, 2005, the content of which is incorporated herein by reference.

BACKGROUND OF THE INVENTION

1. Field of the Invention

The present invention relates to a method and to a system for providing speech synthesis on a user terminal over a communications network. In particular, the present invention relates to a service architecture for providing speech synthesis on user terminals with limited memory availability, such as mobile phones, PDAs (Personal Digital Assistant), personal organizers and digital cameras.

The invention has been developed with particular attention paid to its possible use in wireless telecommunications networks, for providing enhanced text-to-speech (TTS) services to mobile terminals having embedded a speech synthesizer module based on the concatenation of speech waveforms stored in a database.

2. Description of the Related Art

Speech synthesis based on concatenation technique is well known in the art, i.e. from patent application WO 00/30069 or from the paper "A concatenative speech synthesis method using context dependent phoneme sequences with variable length as search units", NHK (Nippon Hoso Kyokai; Japan Broadcasting Corp.) Science and Technical Research Laboratories, 5th ISCA Speech Synthesis Workshop, Pittsburgh, USA, June 2004.

Document WO 00/30069 discloses a speech synthesizer based on concatenation of digitally sampled speech units from a large database.

The paper "A concatenative speech synthesis method using context dependent phoneme sequences with variable length as search units" provides a method of dividing an input text into context dependent phoneme sequences and a method of selection of a proper voice waveform database from a static speech database. The speech quality increases when a large speech database is used.

The inventors have observed that the quality of such a speech synthesis system, when embedded on a mobile terminal, is intrinsically limited by the maximum database size, which cannot be increased at will on a limited resources terminal.

Document EP 1471499 A1 illustrates a method of distributed speech synthesis, performing a text to speech conversion based on a distributed processing between a remote server and a user terminal. In particular, the synthesis of speech segments is performed by the server. The user terminal downloads synthesized speech segments and concatenates them by means of server rules. Moreover, the user terminal performs a cache mechanism according to the rules provided by the server.

The inventors have observed that, although high quality speech synthesis can be achieved using a distributed speech synthesis system, in such systems it is not feasible to perform speech synthesis without an active network connection, thus limiting effectiveness of some user terminals, e.g. PDAs.

Document US 2004/0054534 illustrates an example of speech synthesis customization based on user preferences. The user selects voice criteria at a local user terminal. The voice criteria represent characteristics that the user desires for a synthesized voice. The voice criteria are communicated to a server. The server generates a set of synthesized voice rules based on the voice criteria and sends them to the local user terminal. The synthesised voice rules represent prosodic aspects of the synthesised voice.

The inventors have observed that the speech synthesis quality of above mentioned speech synthesis systems is, as a general rule, directly related to the size of the database of speech waveforms used.

The inventors have tackled the problem of obtaining a significant increase in quality of speech synthesis on systems which are embedded on mobile terminals, without affecting too much the memory requirements of the speech waveforms database. In particular, the inventors have tackled the problem of dynamically customizing a speech synthesis system based on concatenation technique, achieving the same quality of a static solution based on a database of speech waveforms so huge that it cannot be stored in portable user terminals.

OBJECT AND SUMMARY OF THE INVENTION

The inventors have found that this problem can be solved by providing a network system architecture capable of dynamically downloading incremental databases of speech waveforms and related indexing information that, integrated into the speech synthesis module in the mobile terminal, enhance a reduced database located in the terminal.

A particular object of the present invention is to provide a service architecture for providing high quality speech synthesis on mobile user terminals with low memory availability.

The object of the invention is thus to provide satisfactory response to the above needs.

According to the present invention, that object is achieved by means of a method having the features set forth in the claims that follow. The invention also relates to a corresponding system as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the invention envisages generating synthesized speech from text data on a user terminal provided with a speech synthesis engine having a basic database of speech waveforms, by:

- extracting context information associated to the text data;
- selecting an incremental database of speech waveforms associated to the extracted context information;
- downloading into the user terminal the incremental database;
- managing the composition of an enlarged database of speech waveforms comprising the basic database and the incremental database of speech waveforms; and converting into synthesized speech the downloaded text data employing the enlarged database of speech waveforms.

The dynamic speech synthesis solution herein proposed is able to achieve the same quality of a static solution based on a huge database. The dynamic solution works on a virtual huge database by using a reduced static database located into the user terminal and downloading the suitable incremental databases only when it is needed. Each incremental database, containing further speech elements with respect to the default database, is related to the context of the specific information to be synthesized. By using the extended database, given by the default database plus the downloaded incremental database(s), the speech synthesis on the user terminal achieves an improved quality.

Each dynamic incremental database is related to one or more information contexts, e.g. economics, sport, comics and so on. The same incremental database can be used to improve the synthesis of several contents concerning the same context. A cache mechanism may be implemented into the user terminal in order to avoid further download of the same incremental database when the information context is not changed, or when a same context is used frequently. Furthermore, incremental databases can be used for customising the speech synthesis performed on a user terminal with respect to server context rules, to the specific user profile or to specific user preferences.

BRIEF DESCRIPTION OF THE DRAWINGS

Further features and advantages of the present invention will be made clearer by the following detailed description of some examples thereof, provided purely by way of example and without restrictive intent. The detailed description will refer to the following figures, in which.

DETAILED DESCRIPTION OF THE INVENTION

Figure 1:
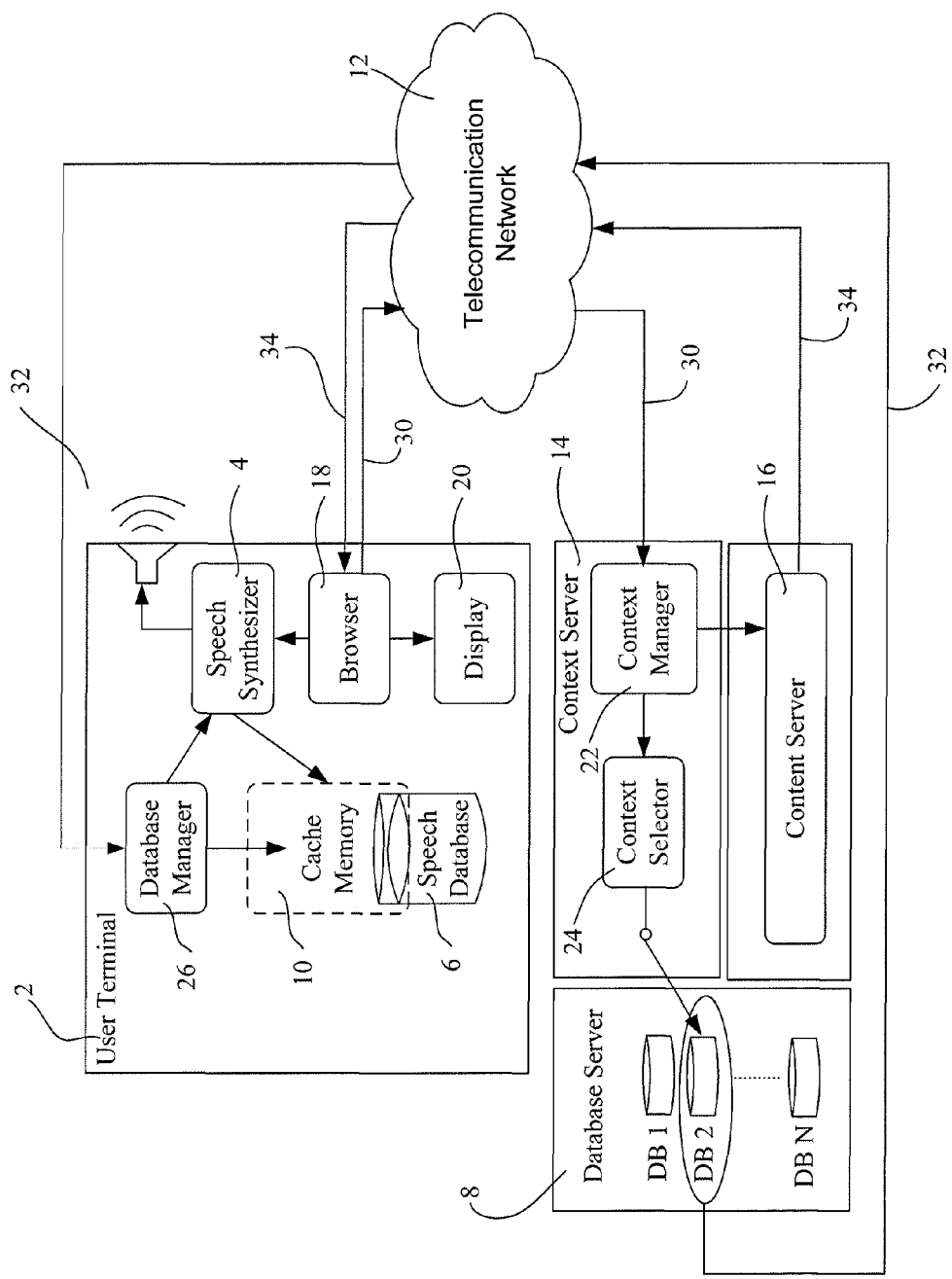
FIG. 1 schematically shows a service architecture for providing speech synthesis on user terminals, according to the present invention.

With reference to FIG. 1, a service architecture for providing, on a user terminal 2 having at least one connection (wire line or wireless) with a telecommunication network 12, speech synthesis from textual information, comprises, besides terminal 2 and network 12, a content server 16 for downloading contents into the user terminal, a context server 14 for selecting a context associated to the information requested by the user, and a database server 8 containing a plurality of incremental databases DB1, . . . , DBN to be downloaded into the user terminal 2.

User terminal 2 is equipped with an embedded speech synthesizer 4 and with a limited default speech database 6. By using this basic configuration, the terminal 2 is able to synthesize any textual information related to any context at a minimum quality level. Textual information may be already present on the user terminal 2 or is retrieved from the remote content server 16 by means of a browser application 18 installed on the same terminal 2 and visualized on a display 20.

In order to improve the synthesis quality, the proposed architecture employs a database server 8 (or a plurality of database servers) able to provide a plurality of incremental databases DB1, . . . , DBN with the aim of increase the default database 6 located in the user terminal 2.

A caching mechanism is furthermore provided in the user terminal 2 in order to efficiently manage the download and storage of the incremental databases into the user terminal. A cache memory 10 makes available the stored incremental database for all the time in which the relative context is used, as additional information required by the user could refer to the same context and therefore to the same incremental database. In this case, no other incremental database is downloaded from the network, the speech synthesis process is accelerated and network resources are optimised.

The caching mechanism associates a "time to live" parameter to each stored incremental database in order to avoid further downloads when the relative context is reused frequently. Parameters governing the caching mechanism, such as for example the cache size and the "time to live", can be either set on the user terminal, by user setting, or according to rules provided by the context server 14.

When the user wishes to synthesize a textual information provided by a remote content server 16, the following actions are performed. Firstly, the user terminal browser 18 sends to the context server 14 a request (arrow 30) related to the information to be synthesized, through the network connection 12. A context manager 22 located into the context server 14 asks the content server 16 for downloading the information contents to the user terminal browser (arrow 34) and extracts context information from the information contents. In the meanwhile the context manager 22 checks if the user terminal has already in cache 10 the suitable incremental database. Several alternatives are possible in order to perform this check, for instance the terminal 2 can communicate the description of already available data bases together with the request (arrow 30), or the context manager 22 can keep track of all previous database downloads 32 associated to a specific user terminal. If the user terminal needs the incremental database, the context manager 22 activates a context selector 24 in order to choose a proper incremental database DB2 in the database server 8, and transfers such incremental database to a database manager 26 on the user terminal 2 (arrow 32). Content server 16, database server 8 and context server 14 can be located in a same server or, indifferently, in separate servers connected to a common telecommunication network (e.g. the Internet).

The database manager 26 on the user terminal 2 receives the incremental database from the network and manages the composition of a new enlarged database, as explained in detail hereinafter. When the new enlarged database is available in the terminal, the database manager 26 notifies the speech synthesizer 4 that a new speech waveforms database is available, achieving therefore a higher synthesis quality.

As regards the relationship between the information contents requested by the user and the incremental database downloaded, different approaches are feasible. Such relationship can be established at "server side", i.e. in the context server 14, or at "client side", i.e. according to user preferences. In the first case such relationship is set according to the server context rules, such as economic context, sport context, comics context and so on, or according to a specific user profile stored in the server. In the second case the decision is performed according to specific user preferences, for example prosody customization, dialectal inflection and so on.

If required, the basic database 2 of speech waveform's can be replaced by a substitute one, by downloading into the user terminal the new database. The downloading and replacement process is managed by the database manager 26, which retrieves the new database from a remote server (e.g. the same database server 8) and replaces the database in the terminal's memory. Such a replacement can be useful, for example, if a user wishes to change the language of the TTS system.

The speech synthesis process embedded on user terminal 2 can be carried out according to two different techniques. According to a first technique, speech synthesis can start as soon as the content is available on the user terminal, avoiding further delays, using the default database, providing the minimum quality level. The speech synthesis quality is then improved when the incremental database is fully downloaded and merged with the database already present in the terminal, allowing the text-to-speech engine using a larger speech database. Otherwise, according to a second technique, the speech synthesis doesn't start immediately using the default database, but starts only as soon as the incremental database is available on the user terminal. In this case the speech synthesis is subject to an initial time delay, but the synthesis quality is, from the beginning, constant at high levels.

Figure 2:
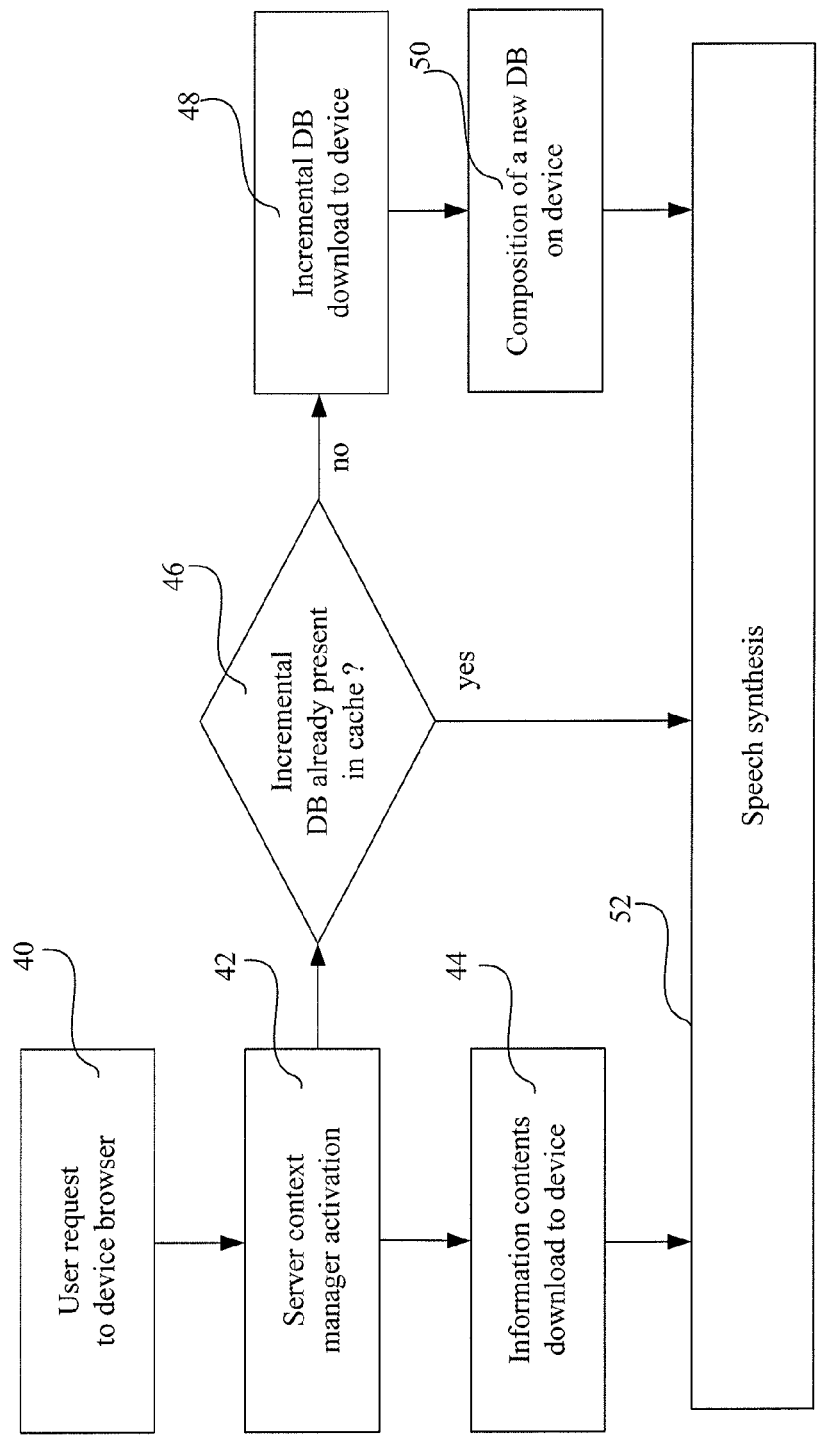
FIG. 2 shows a flow diagram of a method for providing speech synthesis on user terminals, according to the present invention.

The flow diagram shown in FIG. 2 illustrates a process according to the first technique, focusing on parallelism of different processes. A user request (step 40) on the terminal browser activates (step 42) the context manager 22 in the context server 14, starting two parallel processes (steps 44, 46) respectively for downloading requested information contents into the user terminal and for checking whether the associated incremental database is already present in the user terminal cache 10. As soon as requested information contents are downloaded into the terminal, the speech synthesis starts (step 52), the same happens if the associated incremental database is already present in the cache 10. On the contrary, if the associated incremental database is not present in cache, it is downloaded into the user terminal (step 48) and merged with the current database in a new enlarged database (step 50), so that the speech synthesis continues (step 52) with improved quality.

Figure 3:
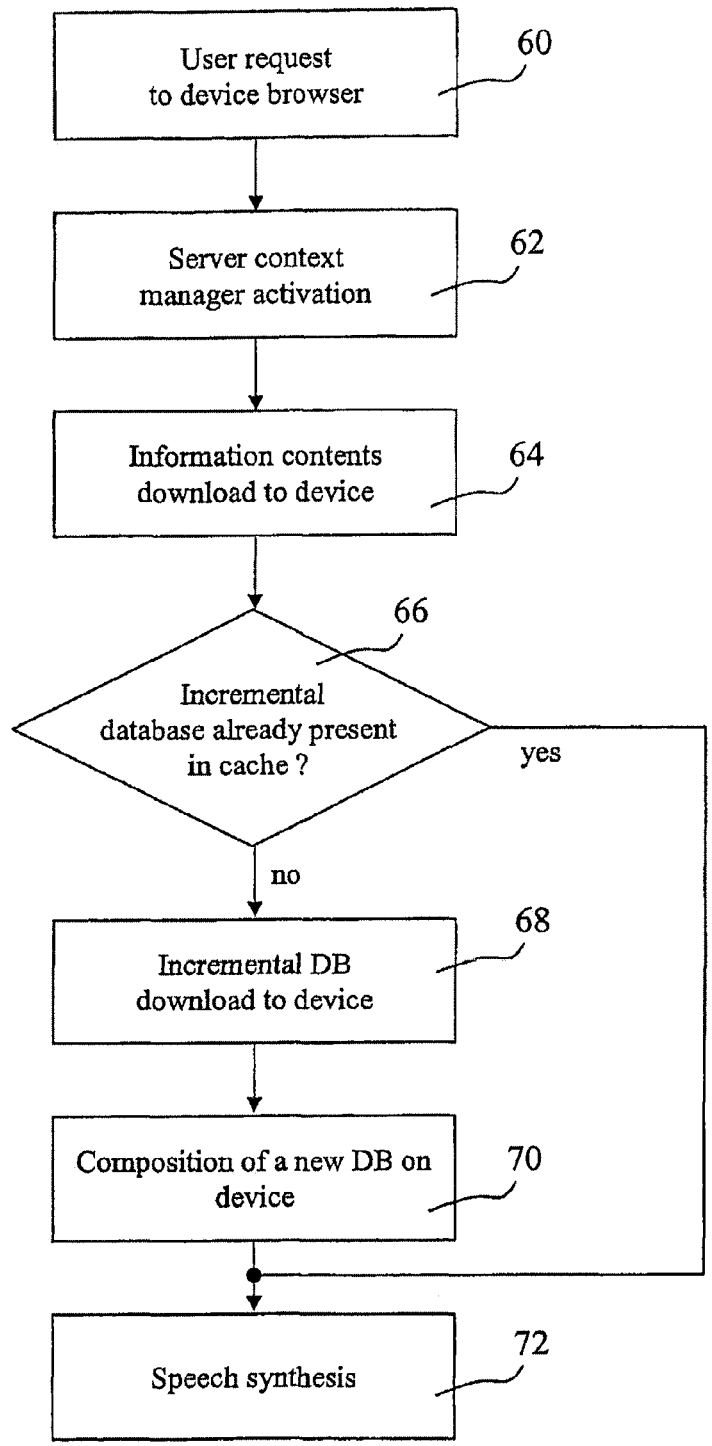
FIG. 3 shows a flow diagram of an alternative method for providing speech synthesis on user terminals, according to the present invention.

The flow diagram shown in FIG. 3 illustrates a process according to the second technique, focusing on serialisation of different processes. A user request (step 60) on the terminal browser activates (step 62) the context manager 22 in the context server 14 for downloading the requested information contents into the user terminal (step 64) and for subsequently checking (step 66) whether the associated incremental database is already present in the user terminal cache 10. If the associated incremental database is already present the speech synthesis is started (step 72), otherwise it is downloaded into the user terminal (step 68) and merged with the current database in a new enlarged database (step 70), and then started the speech synthesis (step 72). According to this technique the speech synthesis process is delayed until the new enlarged database is available, so that the quality of the speech is constant during synthesis phase.

The merging procedure of an incremental database into an existing database, i.e. the default database in the user terminal, will be explained in detail hereinafter with reference to FIGS. 4 and 5.

Figure 4:
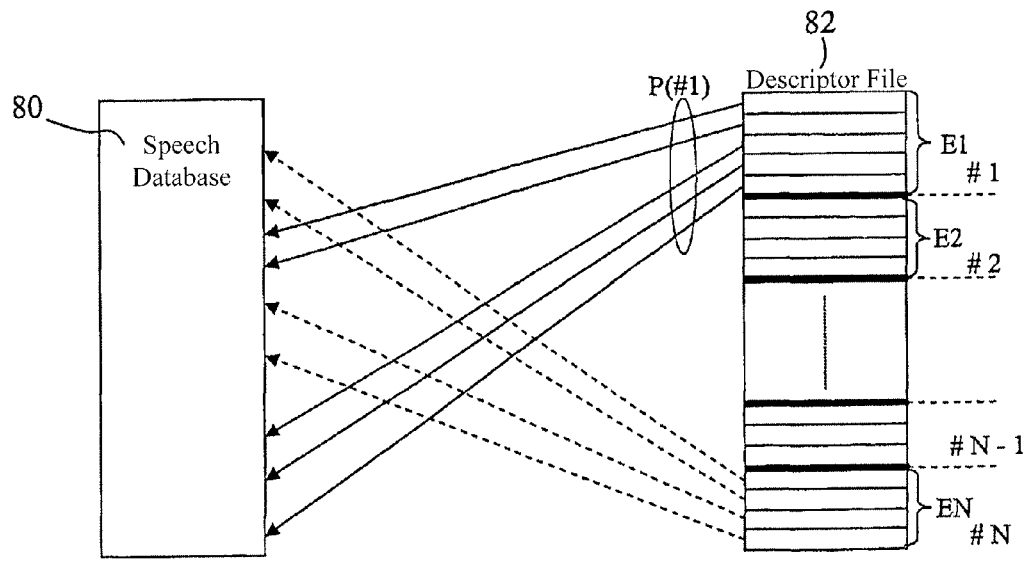
FIG. 4 schematically shows a default speech database of a speech synthesis system embedded on a user terminal, according to the present invention.

FIG. 4 illustrates a speech database structure of a speech synthesis system, in particular the default database 6 of the user terminal 2. The speech database comprises a database of speech units, or speech waveforms, 80 and an associated descriptor file 82 related to that database. The descriptor file 82 contains a reference table that lets the speech synthesizer 4 know the position of the required speech unit in the database of speech units 80.

In a particular embodiment the descriptor file 82 is a diphone reference table, where a "diphone" is intended as a fundamental speech unit composed of two adjacent half-phones. The diphone reference table 82 contains information about all the diphones present in the database of speech units 80. Each diphone #1 . . . #N has a corresponding portion E1 . . . EN of the table 82, as shown in FIG. 4, containing:

the pointers P(#n) to all the speech segments of the default speech database containing such a diphone;

any other information needed by the synthesis algorithm in order to perform the best unit selection (e.g. prosodic information, pitch, position of the diphone inside the speech segment).

Figure 5:
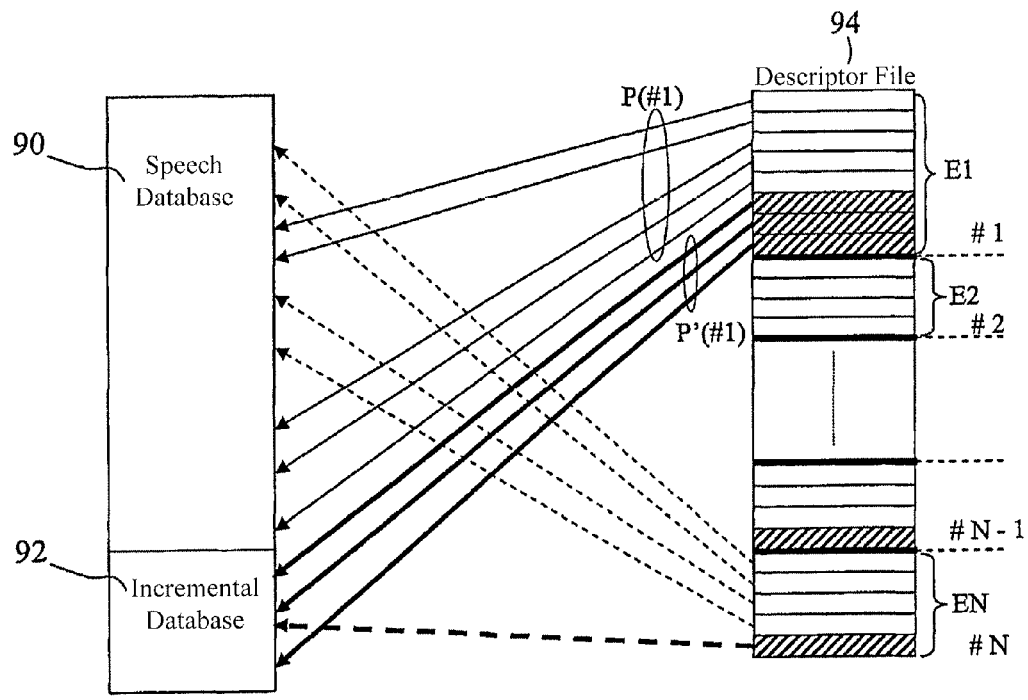
FIG. 5 schematically shows an enhanced speech database of a speech synthesis system embedded on a user terminal, according to the present invention.

FIG. 5 illustrates a speech database structure after the downloading of an incremental database 92 of speech units over a previous database of speech units 90 already present in the user terminal, and the corresponding upgrade of the diphone reference table 94. The upgrade of the diphone reference table 94 comprises, for example, if the downloaded incremental database of speech units 92 contains a speech segment with the diphone #1, integrating the portion E1 of the table relative to diphone #1 with further pointers P'(#1) to those added speech segments.

As regards the upgrade procedure of the speech database on the user terminal, performed remotely by the context server 14, two approaches are possible.

According to a first approach, the context manager 22 sends to the user terminal 2 a suitable incremental database with an associated new descriptor file (the complete diphone descriptor file 94 in the above example). The database manager 26 stores the incremental database in the cache memory 10 and replaces the descriptor file with the new one.

According to a second approach, the context manager 22 sends to the user terminal 2 the incremental database and a patch file that the database manager 26 applies to the descriptor file already present in the user terminal in order to upgrade it to the new descriptor file 94.

Advantageously, according to the present invention, speech synthesis can be performed on a mobile terminal without any network connection, improving usability of the applications/services based on speech synthesis. A fully operational TTS engine is in fact always available on the terminal, thanks to the embedded default speech database.

Moreover, thanks to the incremental databases downloaded through the network connection, the speech synthesis quality can be improved, achieving the same high quality of a static solution based on a huge database that could not be stored in a limited memory user terminal.

According to the invention service providers can differentiate services based on speech synthesis through the differentiation of the quality of supplied services, according to the availability of proprietary incremental databases.

The invention claimed is:

1. A method of generating synthesized speech from textual information on a user terminal, said user terminal being provided with a speech synthesis engine having a basic database of speech waveforms, comprising the steps of:

starting speech synthesis of said textual information employing said basic database of speech waveforms;

sending to a context server a request related to the textual information to be synthesized, the request seeking an incremental database based on a context of said textual information to be synthesized, wherein the context is to be determined from context information extracted from said textual information to be synthesized;

receiving the incremental database of speech waveforms associated with said context;

managing the composition of an enlarged database of speech waveforms comprising said basic and said incremental databases of speech waveforms; and continuing speech synthesis of said textual information employing said enlarged database of speech waveforms, wherein at least part of the basic database and at least part of the incremental database are used to synthesize the speech.

2. The method of claim 1, wherein said step of receiving said incremental database comprises:

downloading, through a communications network, said incremental database from said context server, if said incremental database is not already present in said user terminal.

3. The method of claim 2, wherein said step of downloading said incremental database into said user terminal comprises:

downloading an incremental database of speech waveforms; and updating a descriptor file of said enlarged database of speech waveforms.

4. The method of claim 1, further comprising the step of storing said incremental database into a cache memory on said user terminal.

5. The method of claim 1, wherein said request seeks an incremental database of speech waveforms associated with said context information selected according to context rules independent of user profiles.

6. The method of claim 1, wherein said request seeks an incremental database of speech waveforms associated with said context information selected according to context rules based on a user profile.

7. The method of claim 1, wherein said textual information is retrieved by said user terminal through a communications network.

8. The method of claim 1, comprising the step of:

replacing said basic database of speech waveforms by downloading, through a communications network, a substitute basic database into said user terminal.

9. The method of claim 8, wherein said communications network is a wireless telecommunication network.

10. A non-transitory computer readable medium encoded with a computer program product, loadable into a memory of at least one computer and comprising software code portions for performing the method of claim 1.

11. A communications system for synthesizing speech from textual information, comprising:

a user terminal, the user terminal further comprising:
  a speech synthesis engine,
  a basic database of speech waveforms, and
  a database manager for managing the composition of an enlarged database of speech waveforms for said speech synthesis engine comprising said basic database of speech waveforms and an incremental database of speech waveforms; and a context server for downloading, over a communications network, said incremental database of speech waveforms into said user terminal, said incremental database being based on a context of said textual information to be synthesized determined from context information extracted from said textual information to be synthesized; and wherein the speech synthesis engine is configured to use at least part of the basic database and at least part of the incremental database to synthesize the speech, said speech synthesis engine starting speech synthesis of said textual information employing said basic database of speech waveforms and continuing speech synthesis of said textual information employing said enlarged database of speech waveforms.

12. The communications system of claim 11, wherein said context server comprises:

a context manager for extracting context information from said textual information; and a context selector for selecting said incremental database of speech waveforms associated with said context information and for downloading said incremental database into said user terminal.

13. The communications system of claim 12, further comprising a database server storing a plurality of incremental databases selected by said context selector.

14. The communications system of claim 12, wherein said context selector operates according to context rules independent of user profiles.

15. The communications system of claim 12, wherein said context selector operates according to context rules based on a user profile.

16. The communications system of claim 11, wherein said user terminal further comprises a cache memory for temporarily storing at least one downloaded incremental database.

17. The communications system of claim 11, further comprising a content server for downloading said textual information into said user terminal.

18. The communications system of claim 11, wherein said communications network is a wireless telecommunication network.

19. A user terminal of a communications network comprising:

a speech synthesis engine;

a basic database of speech waveforms; and an application for retrieving textual information to be converted into synthesized speech comprising:

a database manager configured to:
    download an incremental database of speech waveforms from a database server, said incremental database being based on a context of said textual information to be synthesized determined from context information extracted from said textual information to be synthesized, and
    manage the composition of an enlarged speech waveforms database for said speech synthesis engine, comprising said basic and said incremental databases of speech waveforms, wherein the speech synthesis engine is configured to use at least part of the basic database and at least part of the incremental database to synthesize the speech, said speech synthesis engine starting speech synthesis of said textual information employing said basic database of speech waveforms and continuing speech synthesis of said textual information employing said enlarged database of speech waveforms.

20. The user terminal of claim 19, further comprising a cache memory for temporarily storing at least one downloaded incremental database.

21. The user terminal of claim 19, wherein said speech synthesis engine is based on concatenative speech synthesis.

* * * * *